(12) United States Patent
Waskiewicz et al.

(10) Patent No.: US 6,324,933 B1
(45) Date of Patent: Dec. 4, 2001

(54) PLANAR MOVABLE STAGE MECHANISM

(75) Inventors: Warren K. Waskiewicz, Clinton; Kurt S. Werder, Stirling, both of NJ (US)

(73) Assignee: Agere Systems Guardian Corp., Berkeley Heights, NJ (US)

( * ) Notice: Subject to any disclaimer, the term of this patent is extended or adjusted under 35 U.S.C. 154(b) by 0 days.

(21) Appl. No.: 09/413,149

(22) Filed: Oct. 6, 1999

(51) Int. Cl.[7] ............................ B25J 17/00; G05B 11/01; G01B 5/00; B23Q 16/00
(52) U.S. Cl. ..................... 74/490.01; 74/471; 318/630; 318/632; 318/640; 33/1 M
(58) Field of Search .......................... 33/1 M, 503, 613, 33/625, DIG. 2, 573, 568; 248/583, 660, 661; 384/12, 9; 74/490.01, 471; 318/630, 632, 640; 250/491.1, 492.22

(56) References Cited

U.S. PATENT DOCUMENTS

| | | | | |
|---|---|---|---|---|
| 1,851,028 | * | 3/1932 | Worrall | 249/583 |
| 3,495,519 | * | 2/1970 | Alfsen et al. | 33/1 M |
| 3,918,167 | * | 11/1975 | Gerber | 33/174 |
| 4,392,642 | * | 7/1983 | Chitayat | 269/73 |
| 4,477,978 | * | 10/1984 | Azuma | 33/180 |
| 4,630,942 | * | 12/1986 | Tsumaki et al. | 384/8 |
| 4,887,360 | * | 12/1989 | Hemmelgarn et al. | 33/1 M |
| 5,092,193 | * | 3/1992 | Yanagisawa | 74/479 |
| 5,105,552 | * | 4/1992 | Bielle | 33/573 |
| 5,130,213 |  | 7/1992 | Berger et al. | 430/4 |
| 5,130,523 | * | 7/1992 | Raleigh et al. | 250/202 |
| 5,140,242 | * | 8/1992 | Doran et al. | 318/640 |
| 5,355,744 | * | 10/1994 | Yanagisawa | 74/479 |
| 5,408,750 | * | 4/1995 | Teng et al. | 33/1 M |
| 5,561,299 | * | 10/1996 | Ishida et al. | 250/442 |
| 5,574,556 |  | 11/1996 | Mori et al. | 356/244 |
| 5,603,243 | * | 2/1997 | Finley | 74/490 |
| 5,663,568 |  | 9/1997 | Waskiewicz | 250/492.2 |
| 5,701,014 |  | 12/1997 | Berger et al. | 250/492.22 |
| 5,744,924 |  | 4/1998 | Lee | 318/568.17 |
| 5,757,160 | * | 5/1998 | Kreuzer | 356/649 |
| 5,760,564 |  | 6/1998 | Novak | 318/687 |
| 5,806,193 |  | 9/1998 | Ebihara | 33/1 M |
| 5,839,324 | * | 11/1998 | Hara | 74/490.09 |
| 5,874,820 |  | 2/1999 | Lee | 318/575 |
| 5,883,703 |  | 3/1999 | Knirck et al. | 355/55 |
| 6,025,689 | * | 2/2000 | Prentice et al. | 318/625 |
| 6,028,376 | * | 2/2000 | Osanai et al. | 310/12 |

* cited by examiner

Primary Examiner—Diego Gutierrez
(74) Attorney, Agent, or Firm—David L. Davis

(57) ABSTRACT

Apparatus for moving a platform in X and Y directions including a first shaft secured along a first edge of the platform and oriented axially in the X direction and a second shaft secured along a second edge of the platform and oriented axially in the Y direction. First and second bearings support the first and second shafts, respectively, for axial movement. First and second linear drive shafts are oriented axially in the Y and X directions, respectively, with each drive shaft having a first end secured to a respective bearing. The drive shafts are arranged for independent axial movement in the Y and X directions and all of the shafts lie substantially in a single plane.

10 Claims, 5 Drawing Sheets

PLANAR MOVABLE STAGE MECHANISM

BACKGROUND OF THE INVENTION

This invention relates to stages for precision movement and location, such as used in precision machines including semiconductor projection lithography equipment and, more particularly, to improved apparatus for moving a stage platform in X and Y directions.

Positioners for moving a workpiece in a projection lithography apparatus are well known. When the lithography is effected by means of an electron beam, the workpiece, and its associated platform, must be maintained in a vacuum. If the platform positioner motors are also maintained in the vacuum, this presents a problem in cooling the motors. Accordingly, it would be desirable to have the motors located in "air" while the platform being moved is located in a vacuum.

To provide smooth movement of the platform, it would be desirable to be able to use air bearings for all the moving parts. Therefore, some means must be provided for isolating the air bearings from the vacuum holding the workpiece platform.

It would also be desirable to minimize the space required for the platform positioner by having the platform and the positioner lying substantially in a plane.

SUMMARY OF THE INVENTION

According to the present invention there is provided apparatus for moving a platform in X and Y directions. The inventive apparatus comprises a first shaft secured to a first edge of the platform and oriented axially in the X direction and a second shaft secured to a second edge of the platform and oriented axially in the Y direction. First and second bearings support the first and second shafts, respectively, for axial movement. A first linear drive shaft is oriented axially in the Y direction and has a first end secured to the first bearing and a second linear drive shaft is oriented axially in the X direction and has a first end secured to the second bearing. The first and second drive shafts are arranged for independent axial movement in the Y and X directions, respectively, and the first and second shafts and first and second drive shafts lie substantially in a single plane.

In accordance with an aspect of this invention, the first bearing is an air bearing and the inventive apparatus further comprises a further air bearing supporting the first drive shaft for axial movement and a conduit coupling the further air bearing to the first bearing.

In accordance with another aspect of this invention, the conduit includes a passageway within the first drive shaft having a first end opening to the periphery of the first drive shaft within the further air bearing and a second end opening to the periphery of the first drive shaft between the further air bearing and the first end of the first drive shaft.

In accordance with a further aspect of this invention, the platform includes a substantially rectangular planar block to which the first and second shafts are secured. The apparatus further comprises a first plate on a first side of the block, a second plate parallel to the first plate on a second side of the block, and a plurality of planar air bearing pads installed in each of the first and second plates. The planar air bearing pads in one of the first and second plates provide a preload to the block.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
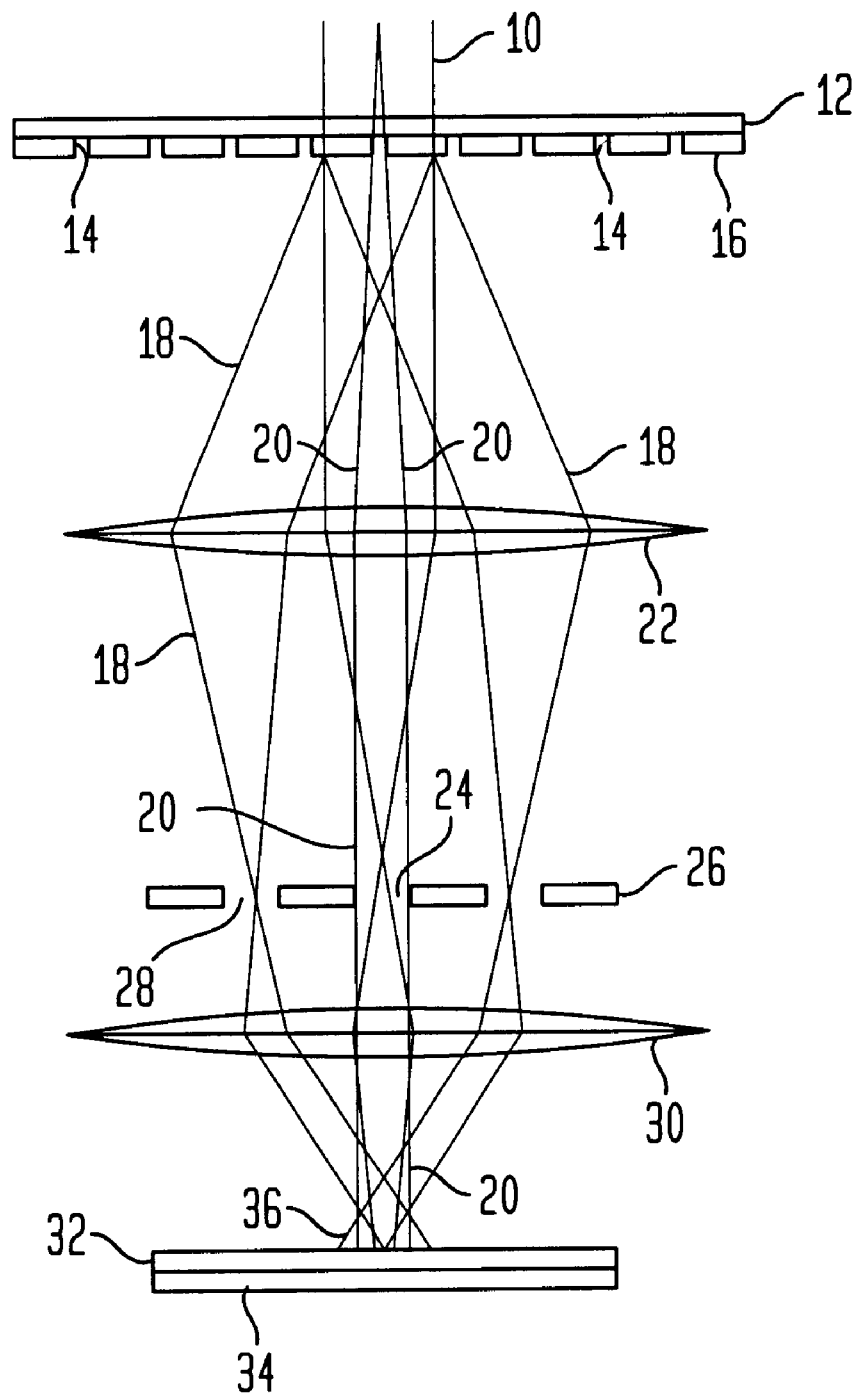
FIG. 1 is a schematic illustration of apparatus in which the present invention may be incorporated.
Figure 2:
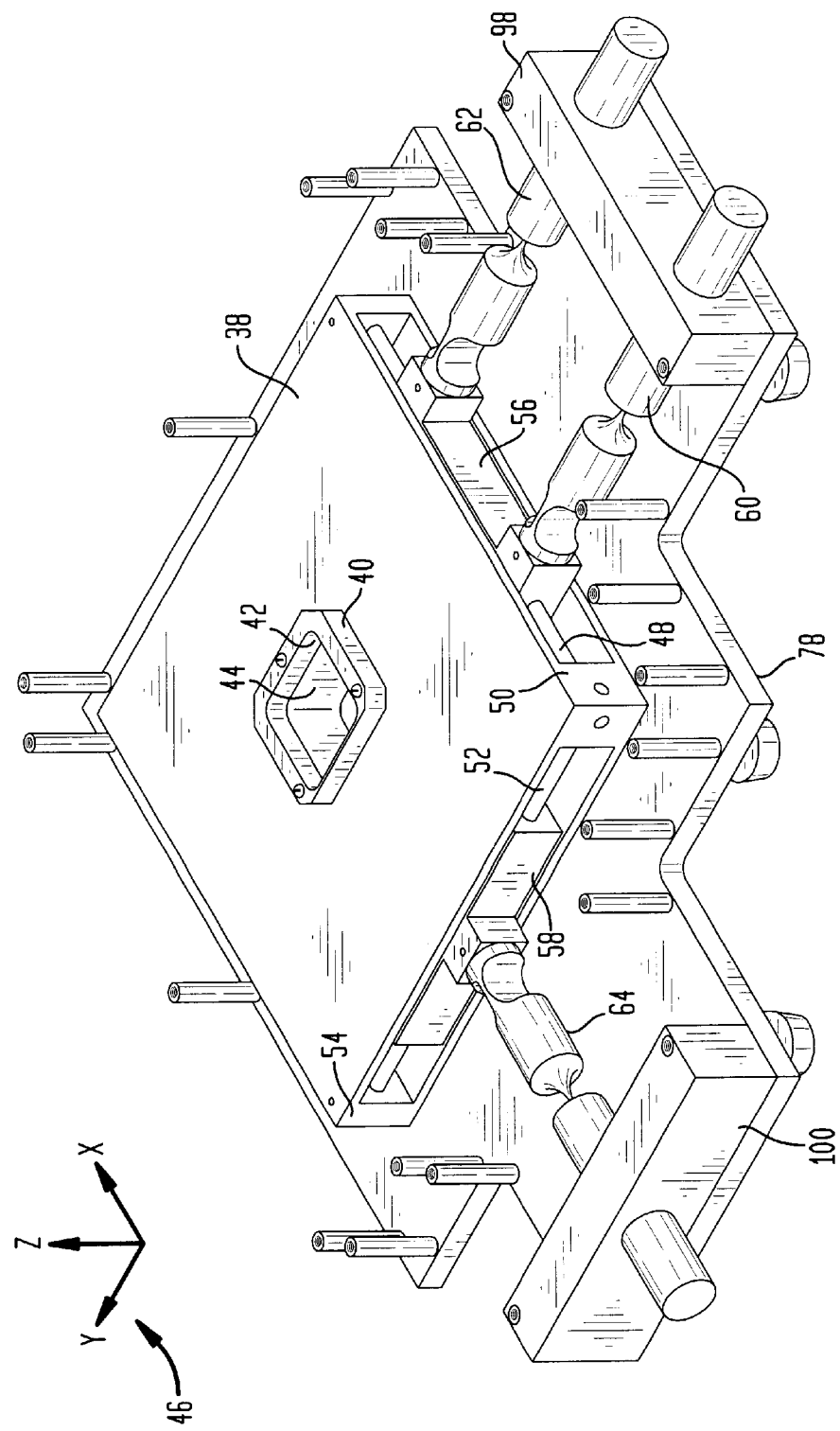
FIG. 2 is a perspective view, with the upper plate removed, showing an embodiment of the present invention.
Figure 3:
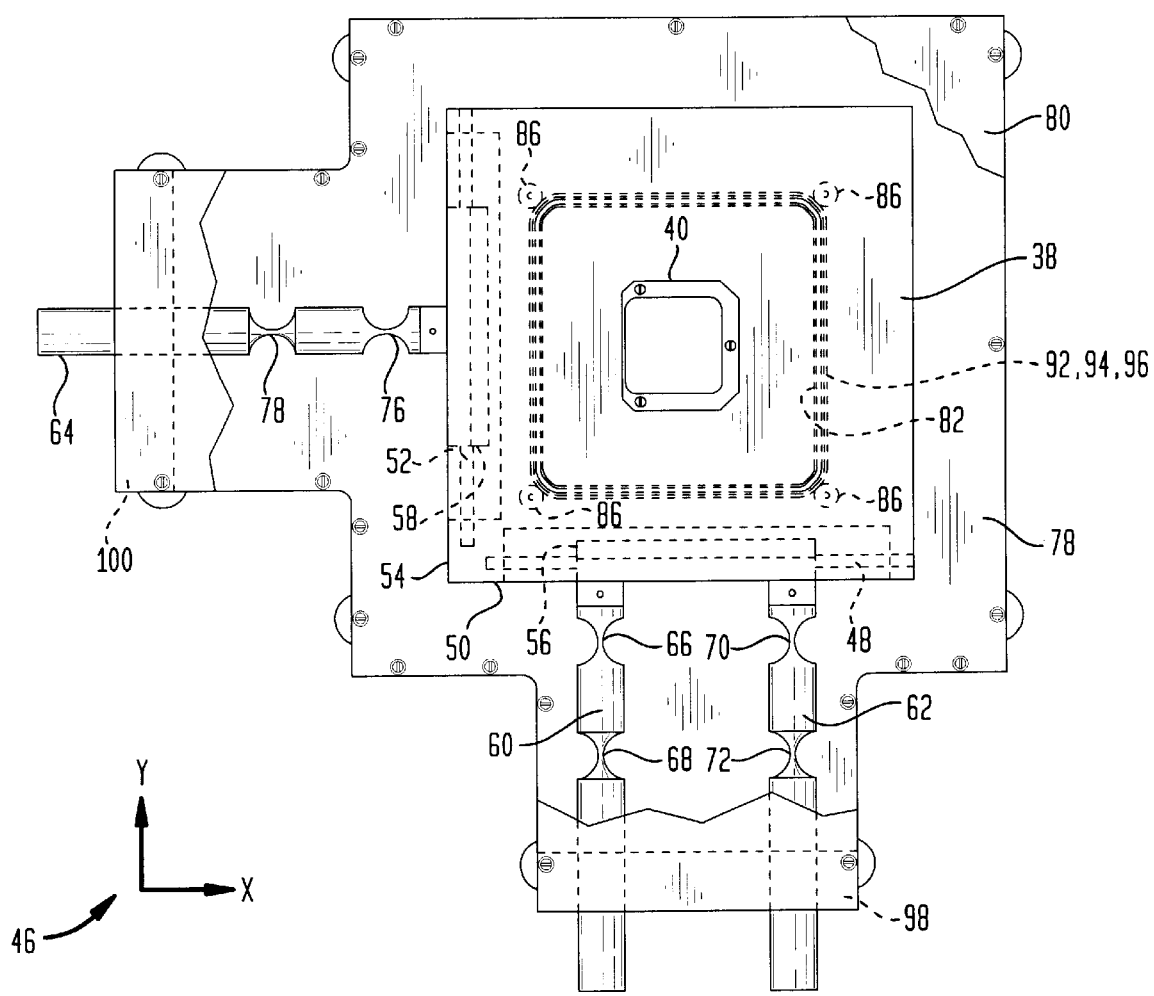
FIG. 3 is a top plan view of the embodiment shown in FIG. 2.

FIG. 1 illustrates an environment in which the present invention finds utility. Thus, FIG. 1 discloses an illustrative projection lithography apparatus where radiation such as electron beam radiation 10 is introduced incident onto a mask 12. The mask 12 has a first region 14 that is transparent to the incident radiation 10 and a second region 16 that scatters the incident radiation 10 that is transmitted therethrough. The radiation beams scattered by the mask 12 are designated as the beams 18, and the radiation beams that are unscattered are designated as 20.

All of the radiation that is transmitted through the mask 12 is incident on a first lens 22. The unscattered radiation 20 is transmitted through the lens 22 and directed through an image aperture 24 in a back focal plane filter 26. The back focal plane filter 26 also has proximity effect correction apertures 28. A portion of the scattered radiation 18 that is transmitted through the first lens 22 passes through the proximity effect correction apertures 28. The untransmitted portion of the scattered radiation (not shown) is absorbed by the back focal plane filter 26. The radiation that passes through the image aperture 24 and the proximity effect correction apertures 28 is incident on a second lens 30. The second lens 30 directs the unscattered radiation 20 onto an energy sensitive material 32 formed on a wafer 34. The unscattered radiation 20 forms an image of the mask 12 in the energy sensitive material 32. The second lens 30 has aberrations therein which focuses the scattered radiation 18 incident thereon in a plane 36 different from the surface of the energy sensitive material 32. The foregoing is known in the art and is disclosed, for example, in U.S. Pat. No. 5,701,014 to Berger et al.

In certain applications of the apparatus shown in FIG. 1, the mask 12 and the wafer 34 are larger than the optics (i.e., the lens 22, the filter 26, and the lens 30). In such a case, a small section of the mask 12 is utilized to expose a small section of the wafer 34, and then the mask 12 and the wafer 34 are moved to effect either a simultaneous scan of the mask 12 and the wafer 34 or an incremental stepping of the mask 12 and the wafer 34. The present invention is concerned with the stages utilized to move the mask 12 and the wafer 34.

An illustrative stage mechanism according to the present invention is shown schematically in FIGS. 2–5. The mechanism includes a platform 38 on which is secured a holder 40 for holding either a mask or a wafer. Illustratively, the platform 38 is a substantially rectangular planar block. The holder 40 has a central opening 42 which is in registration with an opening 44 through the platform 38. According to the present invention, the platform 38 is arranged for movement in the X and Y directions, as defined by the coordinate arrows 46.

To provide such movement, a shaft 48 is secured along a first edge 50 of the platform 38 and is oriented axially in the X direction. A second shaft 52 is secured along a second edge 54 of the platform 38 and is oriented axially in the Y direction. A bearing 56 supports the shaft 48 for axial movement and a bearing 58 supports the shaft 52 for axial movement. The bearings 56, 58 are preferably sleeve air-bearings. A linear drive shaft 60 is oriented axially in the Y direction and has a first end secured to the bearing 56. Illustratively, for reasons which will be discussed hereinafter, another drive shaft 62 is spaced from and parallel to the drive shaft 60 and likewise has an end secured to the bearing 56. A linear drive shaft 64 is oriented axially in the X direction and has an end secured to the bearing 58. Although not shown in the drawings, each of the drive shaft 60, 62, 64 is coupled at its end opposite a respective bearing 56, 58 to a linear drive mechanism, such as, for example, a linear motor, arranged to move axially the respective drive shaft 60, 62, 64. Thus, movement of the drive shaft 64 results in movement of the platform 38 in the X direction and movement of the drive shafts 60, 62 causes movement of the platform 38 in the Y direction. Because of the arrangement of the shafts 48, 52 and the bearings 56, 58, these movements in the X and Y directions are independent from each other.

It is noted that the platform 38, the shafts 48, 52 and the drive shafts 60, 62, 64 all lie substantially in a single plane. This minimizes the space taken up by the stage mechanism.

The use of two drive shafts 60, 62 along one of the axes, illustratively the Y axis, provides yaw control by differentially driving the drive shafts 60, 62. It is also noted that the drive shafts 60, 62, 64 are formed with flexures 66, 68, 70, 72, 76, 78. The combination of the flexured drive shafts 60, 62, 64 and the bearings 56, 58 decouples the drive axes from each other and isolates the platform 38 from external moments.

Figure 4:
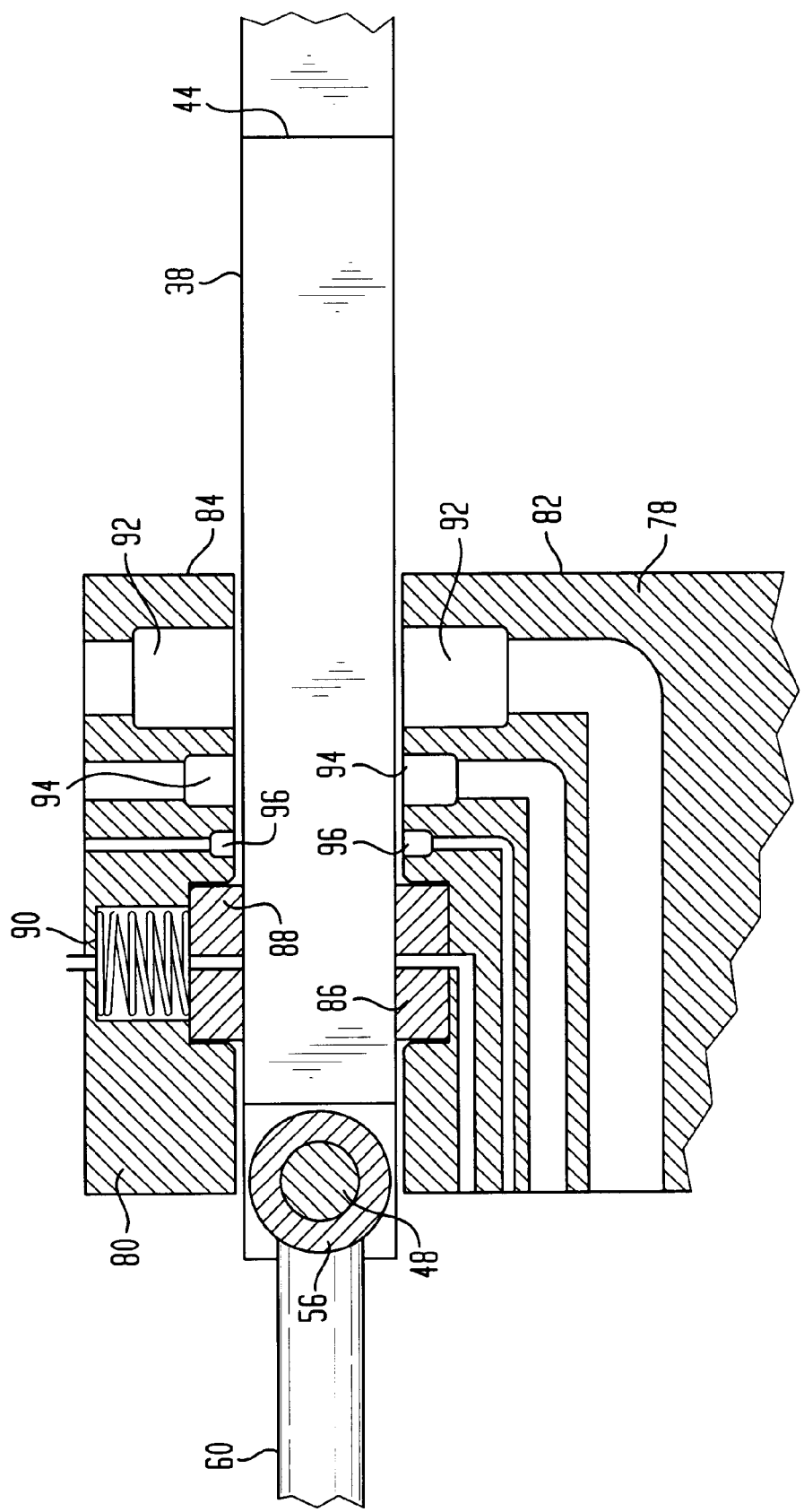
FIG. 4 is a partial cross sectional view illustrating the air bearing pads and vacuum isolation.

To support the platform 38 for planar movement, there is provided a lower plate 78 and an upper plate 80. The plates 78, 80 are formed with openings 82, 84, respectively, surrounding the holder 40. To support the platform 38 relative to the plates 78, 80, opposed pairs of planar air-bearing pads are provided in the plates 78, 80 near the corners of the openings 82, 84. Thus, as best shown in FIG. 4, a lower planar air-bearing pad 86 is provided in the lower plate 78 and is across the platform 38 from the air-bearing pad 88 provided in the upper plate 80. The air-bearing pad 88 provides a downward preload to the platform 38, as schematically illustrated by the spring 90. While a spring 90 has been illustrated, it is understood that various other ways of providing the preload, such as by magnetic or vacuum means on the lower side of the platform 38 are also contemplated. The aforedescribed configuration allows planar motion of the platform 38 while constraining out-of-plane motion.

As previously discussed, the holder 40 may be required to be in a vacuum, as for example, when the aforedescribed apparatus is used in a projection electron beam lithography tool. In such an environment, the vacuum is maintained within the openings 82, 84 of the plates 78, 80. To isolate this vacuum from the surrounding environment, the platform 38 is designed such that the flat and parallel surfaces have low porosity and are good gas barriers. The central portion of the platform 38 is pumped and isolated from the peripheral portion of the platform 38 via planar differentially pumped seals. These seals consist of a number of concentric pumping channels 92, 94, 96 in each of the plates 78, 80 between the bearing pads 86, 88 and the openings 82, 84. The channels 92, 94, 96 are used to progressively evacuate gas from the surfaces of the platform 38 and from the leak formed between the platform 38 and the plates 78, 80. Although air-bearings with differentially pumped vacuum isolation have been used in other applications, they are often limited by the conductance of the vacuum plumbing. In order to provide good vacuum isolation, progressively higher vacuum levels must be maintained between pumping stages (vacuum levels within concentric pumping channels must improve by as much as three orders of magnitude per stage). The described differential pumping configuration allows much better isolation by accommodating large pumping channels which provide the required molecular flow to the final high vacuum pumping stages.

Figure 5:
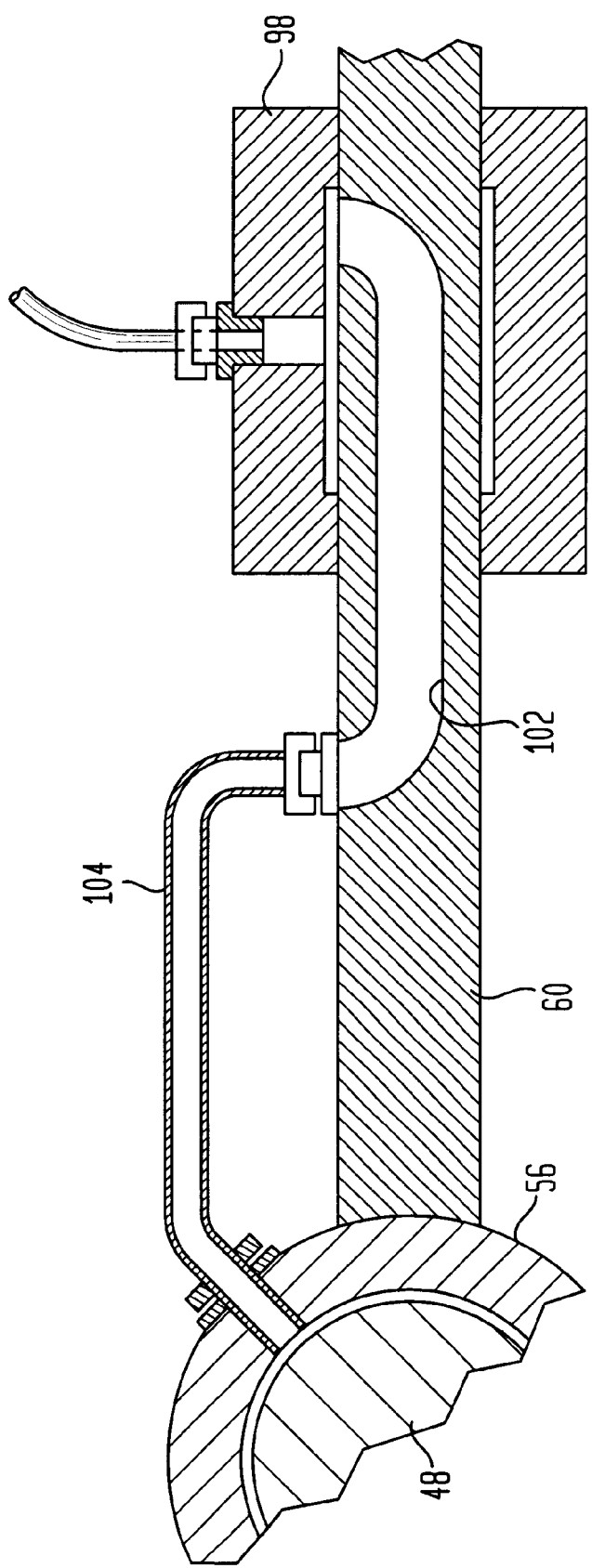
FIG. 5 schematically shows the feeding of air from a drive shaft air bearing to a journal bearing.

A problem overcome by the present invention is to provide an air supply to the bearings 56, 58, which are preferably sleeve air-bearings. Since these bearings 56, 58 move with respect to the plates 78, 80, some means must be provided for providing air to the bearings 56, 58 without having flexible hoses or the like which could get entangled or interfere with movement of the platform 38. This problem is obviated by providing an air-bearing 98, 100 for each of the drive shafts 60, 62, 64. As shown in FIG. 5, the drive shaft 60 (as well as the drive shafts 62, 64) is provided with an internal passageway 102 which has a first end opening to the periphery of the drive shaft 60 within the air-bearing 98. The air-bearing 98 is sufficiently long that the opening of the passageway 102 therein remains within the air-bearing 98 over the entire range of travel of the drive shaft 60. The other end of the passageway 102 opens to the periphery of the drive shaft 60 between the air-bearing 98 and the end of the drive shaft 60 which is connected to the bearing 56. Piping 104 is coupled between the passageway 102 and the bearing 56. This piping 104 can be rigid so as to not interfere with movement of the platform 38.

Accordingly, there has been disclosed improved apparatus for moving a stage platform in X and Y directions. While an illustrative embodiment of the present invention has been disclosed herein, it is understood that various adaptations and modifications to the disclosed embodiment are possible and it is intended that this invention be limited only by the scope of the appended claims.

What is claimed is:

1. Apparatus for moving a platform in X and Y directions, comprising:
   a first shaft secured along a first edge of the platform and oriented axially in the X direction;
   a second shaft secured along a second edge of the platform and oriented axially in the Y direction;
   a first bearing supporting the first shaft for axial movement;
   a second bearing supporting the second shaft for axial movement;
   a first linear drive shaft oriented axially in the Y direction and having a first end secured to the first bearing; and
   a second linear drive shaft oriented axially in the X direction and having a first end secured to the second bearing;
   wherein the first and second drive shafts are arranged for independent axial movement in the Y and X directions, respectively; and
   wherein the first and second shafts and the first and second drive shafts lie substantially in a single plane.

2. The apparatus according to claim 1 wherein said first bearing is an air bearing, the apparatus further comprising:

a further air bearing supporting the first drive shaft for axial movement; and a conduit coupling the further air bearing to the first bearing.

3. The apparatus according to claim 2 wherein the conduit includes a passageway within the first drive shaft having a first end opening to the periphery of the first drive shaft within the further air bearing and a second end opening to the periphery of the first drive shaft between the further air bearing and the first end of the first drive shaft.

4. The apparatus according to claim 3 wherein the conduit further includes piping coupled between the second end of the passageway and the first bearing.

5. The apparatus according to claim 1 further comprising a holder secured to the platform, and wherein the holder is maintained in a vacuum and the first and second shafts, the first and second bearings and the first and second drive shafts are outside the vacuum.

6. The apparatus according to claim 1 wherein the platform includes a substantially rectangular planar block to which the first and second shafts are secured, the apparatus further comprising:

a first plate on a first side of the block;

a second plate parallel to the first plate on a second side of the block; and a plurality of planar air bearing pads installed in each of the first and second plates;

wherein the planar air bearing pads in one of the first and second plates provide a preload to the block.

7. The apparatus according to claim 6 wherein a central region of the block is maintained in a vacuum and isolation of the central region is attained by a plurality of concentric differentially pumped seal channels on each of the first and second plates surrounding the central region and inward of the planar air bearing pads.

8. The apparatus according to claim 1 further comprising a third linear drive shaft parallel to one of the first and second drive shafts and having a first end secured to the respective one of the first and second bearings and wherein each of the drive shafts is formed with a respective flexure;

whereby yaw control is effected by differentially driving the third drive shaft and the associated parallel drive shaft.

9. The apparatus according to claim 1 wherein each of the first and second bearings comprises a respective sleeve bearing.

10. The apparatus according to claim 9 wherein each sleeve bearing is an air-bearing.

* * * * *